US012434956B2

(12) United States Patent
Schuettpelz

(10) Patent No.: US 12,434,956 B2
(45) Date of Patent: Oct. 7, 2025

(54) MANHOLE COVER TOOL AND METHOD

(71) Applicant: Kevin J. Schuettpelz, Kaukauna, WI (US)

(72) Inventor: Kevin J. Schuettpelz, Kaukauna, WI (US)

( * ) Notice: Subject to any disclaimer, the term of this patent is extended or adjusted under 35 U.S.C. 154(b) by 347 days.

(21) Appl. No.: 18/100,295

(22) Filed: Jan. 23, 2023

(65) Prior Publication Data

US 2023/0382705 A1 Nov. 30, 2023

Related U.S. Application Data

(63) Continuation-in-part of application No. 17/824,443, filed on May 25, 2022, now Pat. No. 11,565,925.

(51) Int. Cl.

| | |
|---|---|
| ***B66F 15/00*** | (2006.01) |
| ***B25G 3/00*** | (2006.01) |
| ***B66F 19/00*** | (2006.01) |
| *B25D 1/02* | (2006.01) |

(52) U.S. Cl.
CPC ............ *B66F 19/005* (2013.01); *B66F 15/00* (2013.01); *B25D 1/02* (2013.01)

(58) Field of Classification Search
CPC .......... B66F 15/00; B66F 19/005; B25D 1/02; B25D 2250/105; B25D 1/045; B25D 1/04; B25D 1/00; B25F 1/006
USPC ....... 81/25, 20; 254/131, 26 R, 131.5; 7/166
See application file for complete search history.

(56) References Cited

U.S. PATENT DOCUMENTS 369,921 A * 9/1887 Crandall ............. F16B 12/2009 403/245
815,064 A * 3/1906 Campbell ............... B66F 15/00 D8/89
1,205,280 A 11/1916 Sommer, Sr.
3,985,338 A * 10/1976 Herrmann ............. B66F 19/005 254/131

(Continued)

FOREIGN PATENT DOCUMENTS

CN 221232481 U * 6/2024
KR 100289693 B1 * 5/2001
KR 20210101 * 8/2021

OTHER PUBLICATIONS https://www.shutterstock.com/image-photo/rusty-pickaxe-open-manhole-1651161817 (Year: 2024).*

(Continued)

*Primary Examiner* — Mahdi H Nejad
(74) *Attorney, Agent, or Firm* — Amundsen Davis, LLC

(57) ABSTRACT

A method to move a manhole cover relative to a manhole. The method includes providing a tool having a body having a front end with a toe, a back end with a heal pad, and a middle area located between the toe and the heal pad. The middle area includes a fulcrum joined to the middle area and an elongated handle joined to the middle area and extending away from the body to a distal end of the handle. Another step is inserting the toe of the tool into a receiving side-hole of the manhole cover. And, there is positioning the fulcrum of the tool on a surface surrounding the manhole cover. Further, there is pulling on the distal end of the handle while simultaneously stepping on the heal pad to pivotally lift the manhole cover via the fulcrum and unseating the manhole cover from the manhole.

20 Claims, 12 Drawing Sheets

(56) References Cited

U.S. PATENT DOCUMENTS

| | | | | | |
|---|---|---|---|---|---|
| 4,042,210 | A * | 8/1977 | Feldmann | B25C 11/00 | 254/26 R |
| 4,488,706 | A * | 12/1984 | Kono | B66F 19/005 | 280/47.24 |
| 4,991,893 | A * | 2/1991 | Gordon | B66F 19/005 | 254/129 |
| 5,732,933 | A * | 3/1998 | Champi | B66F 15/00 | 254/131.5 |
| 5,865,425 | A * | 2/1999 | Meadows | B66F 15/00 | 254/26 R |
| 6,113,074 | A * | 9/2000 | Foley | B25C 11/00 | 254/131.5 |
| D438,082 | S | 2/2001 | Stegner et al. | | |
| 6,202,985 | B1 * | 3/2001 | Chong | B66F 15/00 | 254/131 |
| 6,202,986 | B1 * | 3/2001 | Goldman | B66F 15/00 | 254/131 |
| 8,177,192 | B1 * | 5/2012 | Taylor | B25C 11/00 | 81/20 |
| 11,358,266 | B2 * | 6/2022 | Noble | B25F 1/006 | |
| 11,565,925 | B1 * | 1/2023 | Schuettpelz | B25D 1/045 | |
| 2005/0017225 | A1 * | 1/2005 | Sleiman | B25D 1/045 | 254/26 E |
| 2005/0280270 | A1 * | 12/2005 | Howard, Jr. | B66F 15/00 | 294/17 |
| 2009/0050861 | A1 * | 2/2009 | Noah | B25D 1/045 | 254/26 E |
| 2010/0299843 | A1 * | 12/2010 | Dapkins, Jr. | B25F 1/00 | 7/138 |
| 2016/0052121 | A1 * | 2/2016 | Smith | B66F 15/00 | 7/146 |
| 2016/0214844 | A1 * | 7/2016 | Brooks | B66F 19/005 | |
| 2016/0263408 | A1 * | 9/2016 | Weinmeister | A62B 3/005 | |
| 2021/0252684 | A1 * | 8/2021 | Sagarese | B25C 11/00 | |
| 2021/0323138 | A1 * | 10/2021 | Villarino, III | B25D 1/02 | |
| 2022/0009070 | A1 * | 1/2022 | Silvestre | B25D 1/045 | |

OTHER PUBLICATIONS

POOK—Manhole Hook and Pick—Manhole Tool https://www.youtube.com/watch?v=KpJrMzkmnvk (Year: 2020).*

Doug Meadows Company, "Manhole Cover Extractors" (Year: 2022), 1 page filed herewith.

Owner Unknown & Not the Applicant, "Hookaroon", Applicant provided image of publicly available product in existence at least as early as May 24, 2022, 1 page filed herewith.

Owner Unknown & Not the Applicant, "Name of product/brand unknown", Applicant provided image of publicly available product in existence at least as early as May 24, 2022, 1 page filed herewith.

Owner Unknown & Not the Applicant, "Rolling Head Pry Bar", Applicant provided image of publicly available product in existence at least as early as May 24, 2022, 3 pages filed herewith.

* cited by examiner

MANHOLE COVER TOOL AND METHOD

CROSS REFERENCE TO RELATED APPLICATIONS

This application is a continuation-in-part of U.S. application Ser. No. 17/824,443, filed May 25, 2022, and titled: "MANHOLE COVER TOOL", the entirety of which is incorporated herein by reference.

TECHNICAL FIELD

This invention generally relates to tools to assist in mechanical movement of parts, and more particularly, to a tool that can be combined with a handle to enhance mechanical leverage and assist in more ergonomically moving a heavy object from one place to another, and preferably more safely and with less overall effort too. This also relates to a method and method of using the tool.

BACKGROUND

There are at least three prior existing tools in the art to try and meet the need of moving a heavy object, like a manhole cover, in particular, removing and moving the manhole cover from its seated location over a manhole. However, each of these tools, and their related methods, has limitations on its effectiveness, and none provide the various combination of benefits my tool and method can provide, especially when it comes to being able to more safely, and with less physical effort, and more ergonomically, remove the manhole cover from the manhole and then move it from over the manhole to adjacent to the manhole and not impeding access to the manhole. Thus, there is a need to address one or more of the deficiencies in the art to better aid in achieving more desirable requirements and avoiding negative ones, for a tool and method like mine, especially when used to remove a manhole cover, and preferably in a way that is more consistent and reliable for such a tool.

SUMMARY

To address one or more deficiencies in the art and/or better achieve the desirable requirements for moving a manhole cover from a manhole, there is provided a tool joinable with a handle to aid in moving the manhole cover from the manhole. The tool includes a body extending from a front end to a back end and from a top edge to a bottom edge. The body further includes a middle area located between the front end and the back end and bounded by the top edge and the bottom edge, with the middle area configured to be joinable to the handle and the handle selectively securable to the body in a fixed relationship. The front end of the body includes a toe extending away from the middle area. The toe includes (i) a first vertical thickness equal to a middle vertical thickness of the middle area where the toe is joined to the middle area, and (ii) a second vertical thickness less than the first vertical thickness for a length of the toe extending away from the middle area. The back end of the body includes a heal pad extending away from the middle area with a first portion of the bottom edge defined by the heal pad being offset a first vertical distance from a second portion of the bottom edge defined by the middle area to create a heal gap between a bottom surface of the heal pad and an imaginary line formed by and extending parallel out from the second portion of the bottom edge defined by the middle area.

In other aspects, there is disclosed a tool joinable with a handle. The tool includes a body extending from a front end to a back end and from a top edge to a bottom edge. The body includes a middle area located between the front end and the back end and bounded by the top edge and the bottom edge, with the middle area configured to be joinable to the handle and the handle selectively securable to the body in a fixed relationship. The front end of the body includes a toe extending away from the middle area. The toe includes (i) a first vertical thickness equal to a middle vertical thickness of the middle area where the toe is joined to the middle area, and (ii) a second vertical thickness less than the first vertical thickness for a length of the toe extending away from the middle area. The back end of the body includes a heal pad extending away from the middle area with a first portion of the bottom edge defined by the heal pad being offset a first vertical distance from a second portion of the bottom edge defined by the middle area to create a heal gap between a bottom surface of the heal pad and an imaginary line formed by and extending parallel out from the second portion of the bottom edge defined by the middle area. The bottom edge is flat in an end-to-end dimension for essentially an entirety of the bottom edge except for the toe and a toe portion of the top edge having a concave upward shape. A fulcrum is joined to the body and defining a fulcrum portion of the bottom edge with the fulcrum projecting away from the top edge.

In yet other aspects, there is disclosed a tool joinable with a handle. The tool includes a body extending from a front end to a back end and from a top edge to a bottom edge. The body includes a middle area located between the front end and the back end and bounded by the top edge and the bottom edge, with the middle area configured to be joinable to the handle and the handle selectively securable to the body in a fixed relationship. The front end of the body includes a toe extending away from the middle area. The toe includes (i) a first vertical thickness equal to a middle vertical thickness of the middle area where the toe is joined to the middle area, and (ii) a second vertical thickness less than the first vertical thickness for a length of the toe extending away from the middle area. A fulcrum is joined to the body and defining a fulcrum portion of the bottom edge with the fulcrum projecting away from the top edge. The fulcrum portion is offset a second vertical distance from the second portion of the bottom edge defined by the middle area to create a fulcrum gap between a bottom surface of the fulcrum and the imaginary line formed by and extending parallel out from the middle area of the bottom edge.

In still other aspects, there is provided a method to move a manhole cover relative to a manhole. The method includes providing a tool including a body having a front end with a toe, a back end with a heal pad, and a middle area located between the toe and the heal pad. The middle area includes (i) a fulcrum joined to the middle area and projecting away from a bottom edge of the body to create a fulcrum gap between a bottom surface of the fulcrum and an imaginary line formed by and extending parallel out from the bottom edge of the body and (i) an elongated handle joined at a handle proximal end to the middle area and extending away from the body to a distal end of the handle. The method also includes inserting the toe of the tool into a receiving side-hole of the manhole cover. Further the method includes positioning the fulcrum of the tool on a surface surrounding the manhole cover. Yet further, the method includes pulling on the distal end of the handle while simultaneously stepping on the heal pad to pivotally lift the manhole cover via the fulcrum and unseating the manhole cover from the manhole.

In still yet other aspects, there is disclosed a method to move a manhole cover relative to a manhole. The method includes providing a tool including a body having a front end with a toe, a back end with a heal pad, and a middle area located between the toe and the heal pad. The middle area includes (i) a fulcrum joined to the middle area and projecting away from a bottom edge of the body to create a fulcrum gap between a bottom surface of the fulcrum and an imaginary line formed by and extending parallel out from the bottom edge of the body and (i) an elongated handle joined at a handle proximal end to the middle area and extending away from the body to a distal end of the handle. The method also includes inserting the toe of the tool into a receiving side-hole of the manhole cover. Further the method includes positioning the fulcrum of the tool on a surface surrounding the manhole cover. Still further, there is the step guiding the distal end of the handle while simultaneously stepping on the heal pad to pivotally lift the manhole cover via the fulcrum and unseating the manhole cover from the manhole. Yet further, there is completely separating the manhole cover from the manhole and rotating the tool and pivoting the tool on the fulcrum to thereby locate the manhole cover over the surface surrounding the manhole cover and then lowering the manhole cover onto the surface.

Other aspects of the disclosure are directed to configurations and features for the tool body, tool middle area, tool toe, tool pad and/or tool fulcrum, each as more fully described herein. Still other aspects of the disclosure are directed to configurations and features for additional method aspects like how and/or when the manhole cover is separated from the manhole, how rotating the tool and/or manhole cover is accomplished, how and then the tool is engaged with the manhole cover and/or the surface, and how a user acts upon the handle and/or heal pad to operate the tool, each as more fully described herein.

BRIEF DESCRIPTION OF THE DRAWINGS

The invention may be more completely understood in consideration of the following detailed description of various features of the invention in connection with the accompanying drawings, in which.

Figure 1:
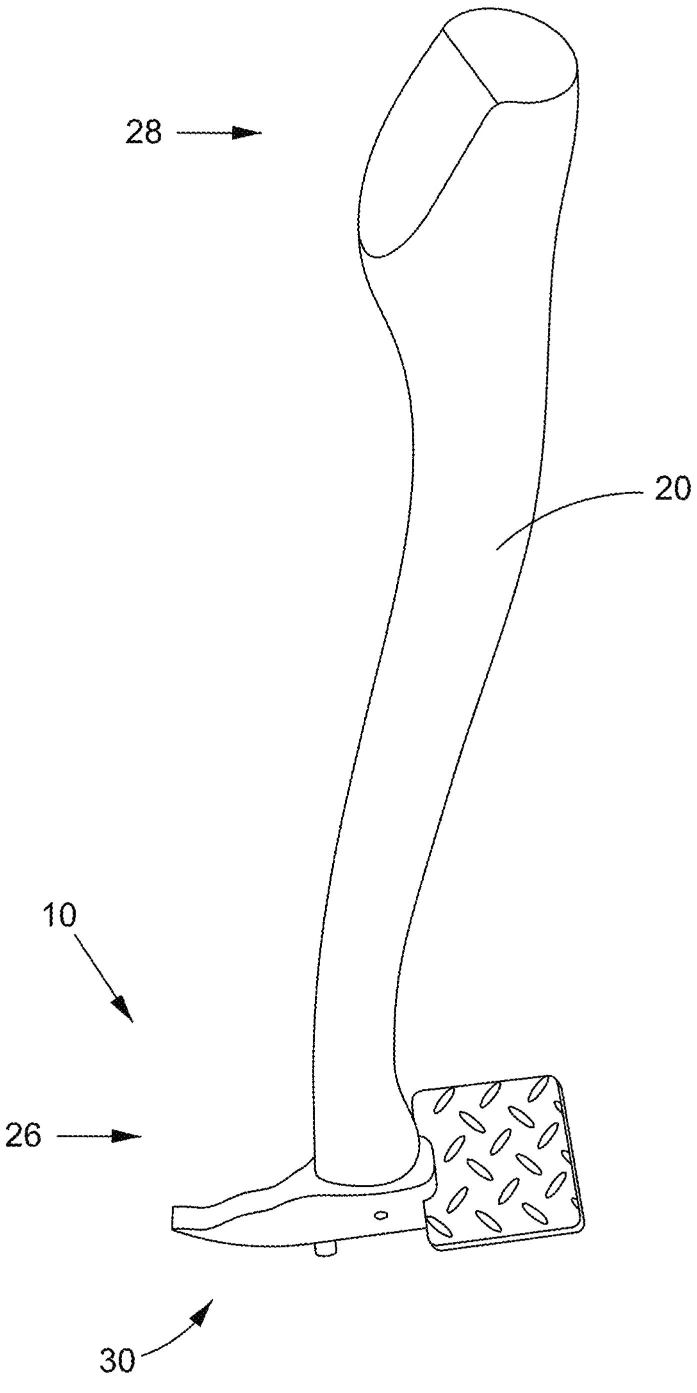
FIG. 1 is a perspective view of my innovative tool joined with a handle.

The drawings show some but not all embodiments. The elements depicted in the drawings are illustrative and not necessarily to scale, and the same (or similar) reference numbers denote the same (or similar) features throughout the drawings, though all the same (or similar) features are not always separately numbered to help avoid over numbering and obscuring what the drawings are disclosing.

DETAILED DESCRIPTION

Figure 2:
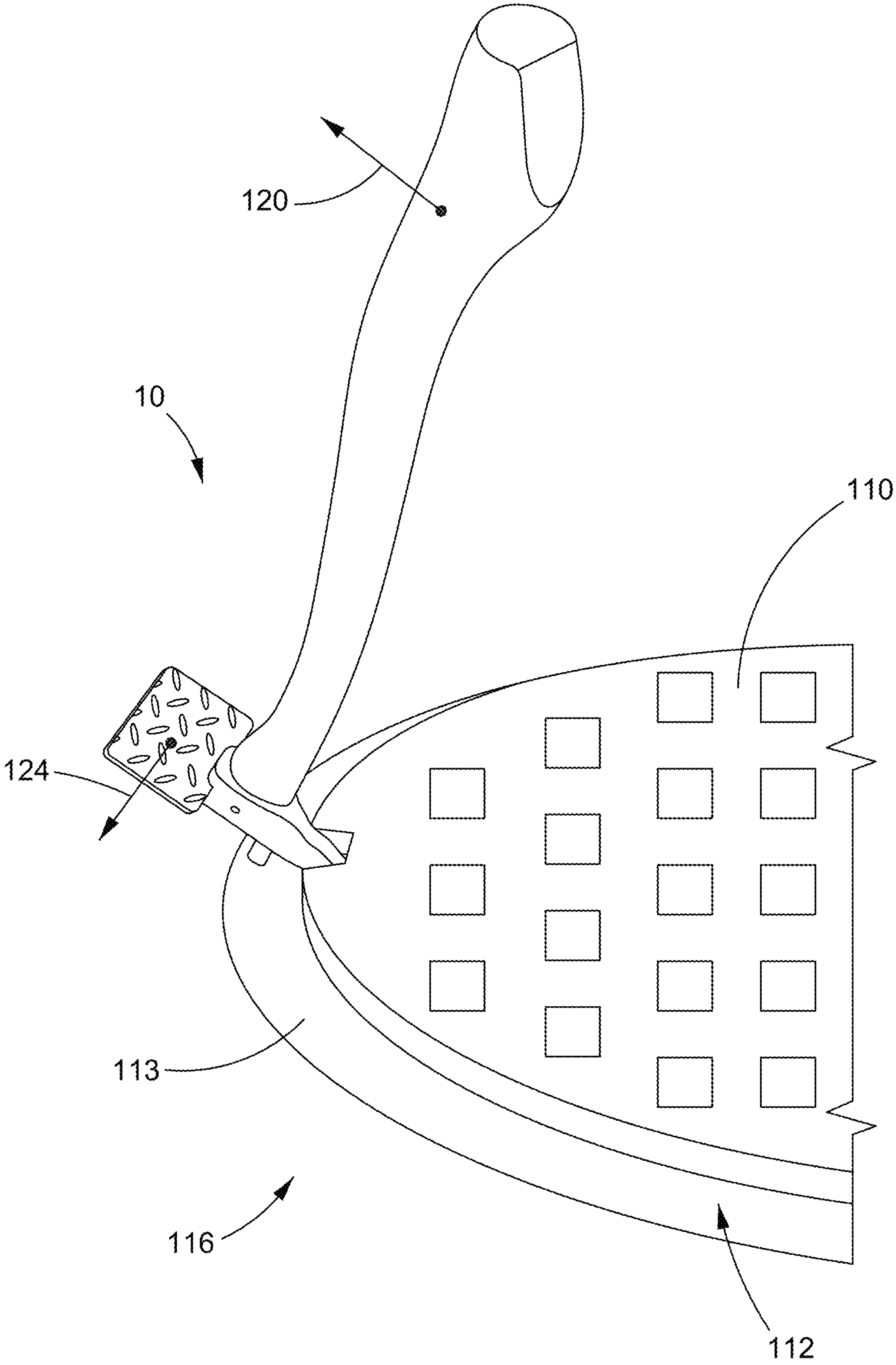
FIG. 2 is another perspective view of that in FIG. 1, and now also engaging a manhole cover to begin to remove the cover from a manhole.
Figure 3:
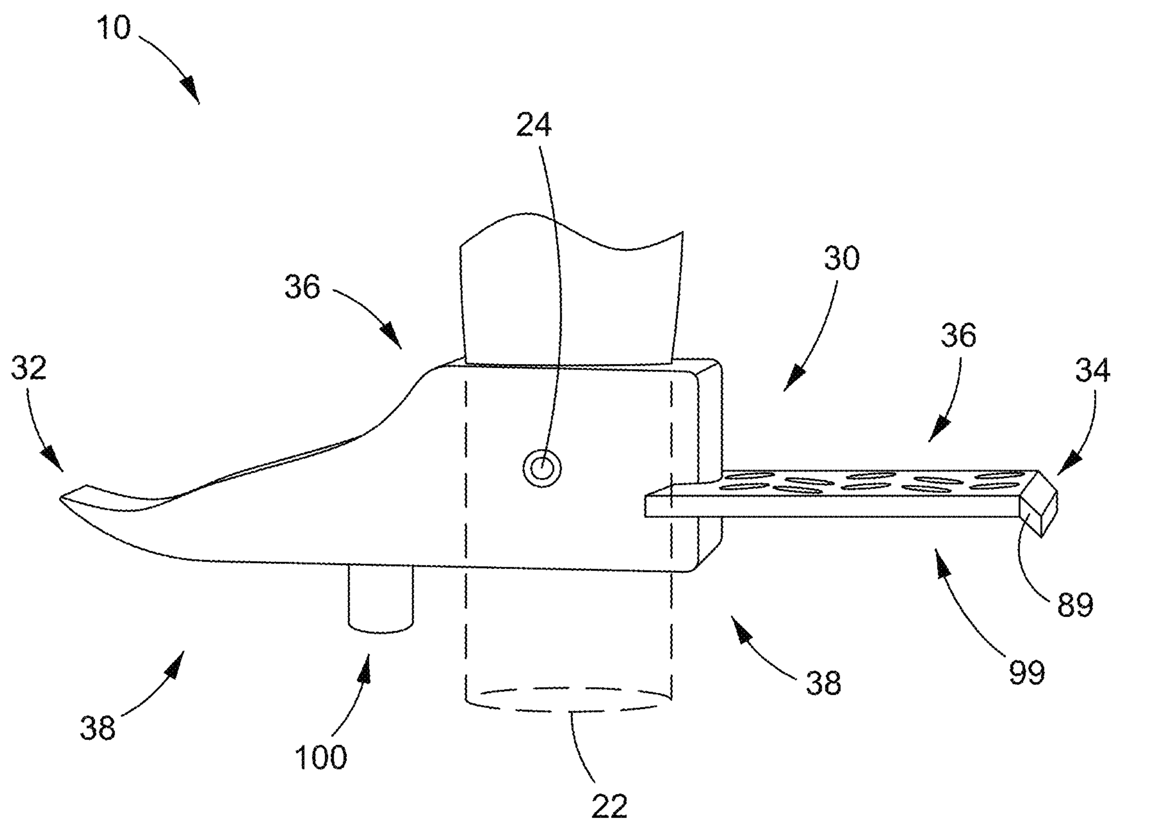
FIG. 3 is an enlarged perspective view of a portion of that in FIG. 1, and also depicting just in this figure an exemplary foot ledge.
Figure 4:
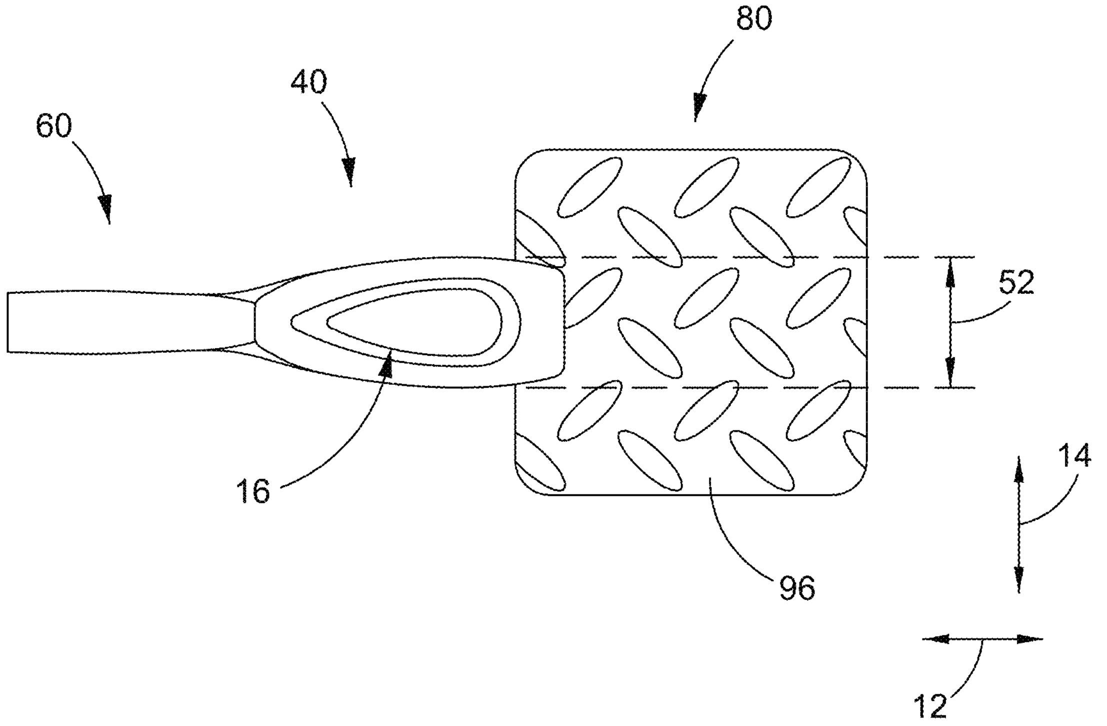
FIG. 4 is a top view of that in FIG. 3 (without the foot ledge)
Figure 5:
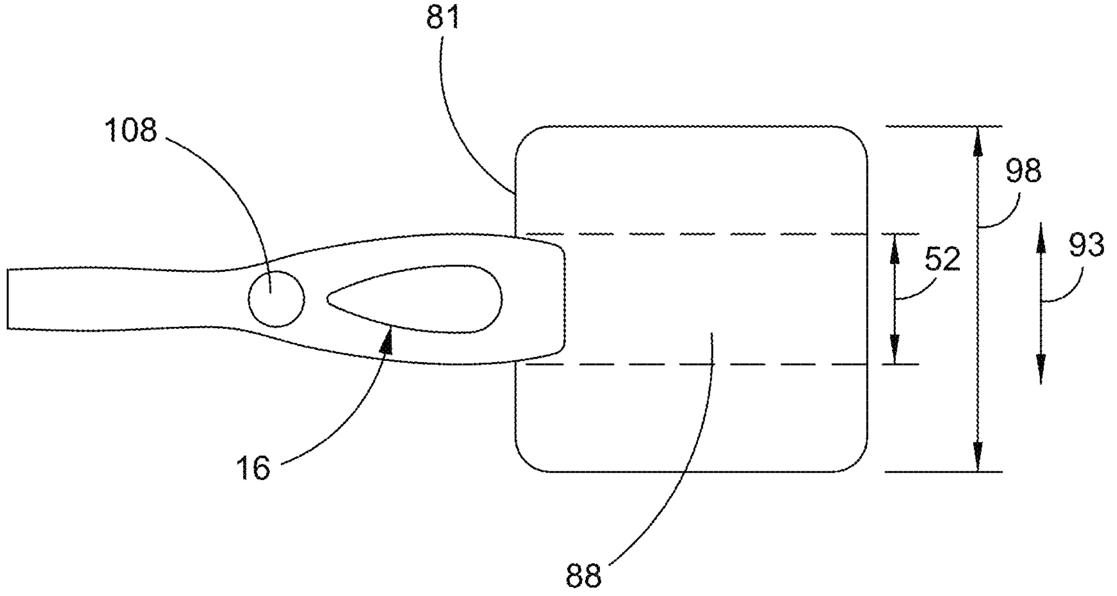
FIG. 5 is a bottom view of that in FIG. 3 (without the foot ledge)

In accordance with the practice of my innovative tool, as seen in the Figures, tool 10 is joinable with a handle 20 to aid in moving a manhole cover 110 from a manhole 112 (as seen in FIG. 2, for example, with the tool beginning to unseat the manhole cover from the manhole). In use, the tool is preferably joined with the handle 20. More preferably, this is a fixed relationship, such as an end of the handle being sized to securely fit within a hole 16 in tool 10 and then be selectively fixed therein by a friction fit, a forced fit, and/or a close fit with a pin 24 located in and through the tool and the end of the handle 20 (as seen in FIG. 3, for example).

Tool 10 includes a body 30 extending from a front end 32 to a back end 34 and from a top edge 36 to a bottom edge 38. The body 30 includes a middle area 40 located between the front end 32 and the back end 34, and bounded by the top edge 36 and the bottom edge 38. The middle area is configured to be joinable to the handle and the handle selectively securable to the body in a fixed relationship, for example, as described previously via hole 16. The tool further includes the front end 32 of the body having a toe 60 extending away from the middle area 40. The toe includes a first vertical thickness 62 equal to a middle vertical thickness 42 of the middle area 40 where the toe 60 is joined to the middle area 40. Further, the toe includes a second vertical thickness 64 that is less than the first vertical thickness 62 for a length of the toe 60 extending away from the middle area 40. Further, the length can be any distance from right next to middle area 40, to outer tip 72 of the toe, and any distance in between, as long as any other features of the body, as desired, are satisfied.

The tool may also include, preferably, the back end 34 of the body having a heal pad 80 extending away from the middle area 40, with a first portion 82 of the bottom edge defined by the heal pad being offset a first vertical distance 84 from a second portion 44 of the bottom edge defined by the middle area to create a heal gap 86 between a bottom surface 88 of the heal pad and an imaginary line 46 formed by and extending parallel out from the second portion 44 of the bottom edge defined by the middle area. For example, and without being limited by a theory of understanding, I have discovered that the heal pad can better provide leverage, and preferably in combination with the handle, to operate the tool when lifting a heavy object, like a manhole cover. That said, the heal pad is not required to practice my tool, but it can definitely be an advantage when made a feature of the tool 10. Further in this regard, the heal gap can be important to helping create this leverage, and as such, is preferably at least about 0.25 inch and less than about 1 inch, more preferably is at least about 3/8 inch and less than about 7/8 inch and most preferably is at least about 7/16 inch and less than about 9/16 inch. Additionally, preferably the heal pad 80 has a heal horizontal width 98 that is greater than a middle area horizontal width 52. In this way, for example, this provides greater surface area for a user to step on and maneuver the tool, without the heal pad getting in the way of other use and operation of the tool. As another option, a front edge 81 of the heal pad can be flush with (not shown) or slightly set into (as shown) the adjoining portion of middle area 40, and formed from two separate components (as shown) that are fixedly secured together, and preferably permanently so once the tool is fully made. As yet a another option, heal pad 80 can include a foot ledge 89 that projects downwardly from the back end of pad 81 (as seen in FIG. 3). This can be a curved or straight sloped structure, that is bent therefrom or formed separately and attached thereto. Ledge 89 can provide added leverage to the user's foot to push or urge tool 10 in a direction away from the user's foot when needed, e.g., for inserting into or under the manhole cover or other structure being acted upon by tool 10.

The tool may also include, preferably, a fulcrum 100 joined to the body 30 and defining a fulcrum portion 102 of the bottom edge with the fulcrum 100 projecting away from the top edge 36. The fulcrum can be elongated and pin-like as seen in the figures, for example, or it could be less elongated and wider that it is long (not shown). Further, preferably, fulcrum portion 102 is offset a second vertical distance 104 from the second portion 44 of the bottom edge defined by the middle area to create a fulcrum gap 106 between a bottom surface 108 of the fulcrum 100 and the imaginary line 46 formed by and extending parallel out from the middle area of the bottom edge. Further in this regard, preferably, the fulcrum gap is at least about 1/2 inch and less than about 1.5 inches, more preferably is at least about 3/4 inch and less than about 1.25 inches and most preferably is at least about 1 inch. Additionally, or separately, another aspect of the fulcrum relates to its location on body 30, especially relative to the handle 20. In this regard, handle 20 has a circumference at its end where it is joinable to the middle area and this can be used to define a handle vertical circumferential projection 22 extending to and through the bottom edge of the body. With this understanding, preferably, at least a portion of the fulcrum 100 is located outside the handle vertical circumferential projection 22, and more preferably, all of the fulcrum 100 is located outside the handle vertical circumferential projection 22 (as seen in all the Figures, when visible). In a similar regard and for similar reasons, preferably, the fulcrum 100 is located closer to the toe 60 than to the heal pad 80. Again, and without being limited by a theory of understanding, I have discovered that the fulcrum can also better provide leverage, and preferably in combination with the handle, to operate the tool when lifting a heavy object, like a manhole cover. Further, the fulcrum can advantageously provide (i) a lifting pivot point to separate the manhole cover from the manhole, and (ii) a rotating pivot point to move and locate the manhole cover beside (or at least no longer over) the manhole so full access can be gained to the manhole.

In other aspects, tool 10 can include, preferably, certain features related to the bottom edge 38, which can enhance manufacturing ease of the tool and/or better operation of the tool. For example, the bottom edge can be flat in an end-to-end dimension 12, for at least a portion of it. As another example, additionally or alternately, the bottom edge can be flat in a side-to-side dimension, for at least a portion of it. As yet another example, more preferably, the bottom edge can be flat in the end-to-end dimension 12 for essentially an entirety of the bottom edge 38 except for the toe 60 or some portion of the toe. As still another example, more preferably, the bottom edge can be flat in end-to-end dimension 12 for essentially an entirety of the bottom edge except for the toe and the fulcrum (i.e., when the fulcrum is part of the tool). As another example still, additionally or alternately, an entirety of the length of the toe 60 except where the toe is joined to the middle area 40 is defined by the second vertical thickness 64, that is, thickness which is less than the middle vertical thickness for essentially the entire toe.

Considering other features of the tool, there is disclosed other, preferred, features related to the toe 60. For example, a toe portion 66 of the top edge can have a concave upward shape 68. More preferred in this regard, the toe portion 66 can have the concave upward shape 68 formed adjacent to a concave downward shape 70. Yet more preferred here, the toe portion 66 can have the downward shape 70 sandwiched between two toe portions each having the concave upward shape 68. As another example, and additionally or alternately, toe portion 66 of the top edge can have the concave upward shape 68 for an outer tip 72 of the toe. This can be particularly advantageous to aid in locating the toe of the tool into an opening in the manhole cover and under the cover for more secure movement of the cover thereafter. Further in this regard, even more preferably the second vertical thickness 64 at the outer tip 72 of the toe narrows to a sharp vertex 74.

Figure 6:
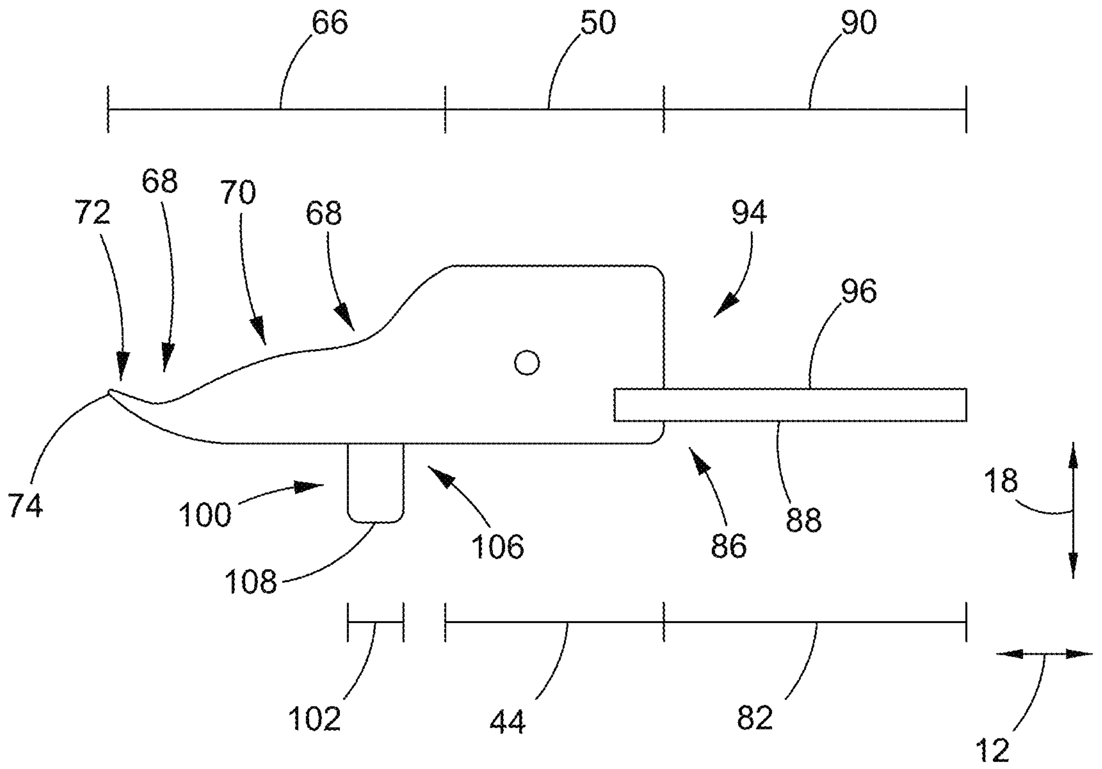
FIG. 6 is a left side view of that in FIG. 3 (without the foot ledge)
Figure 7:
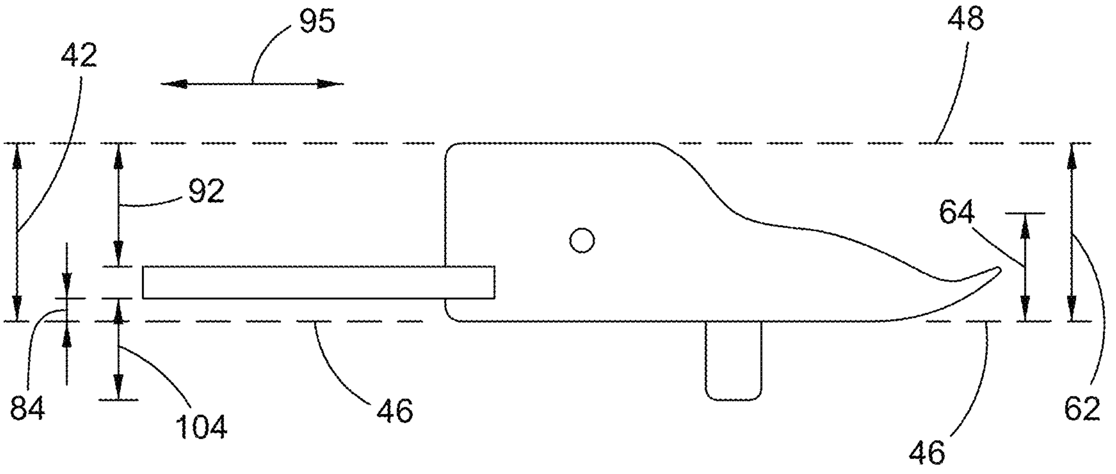
FIG. 7 is a right side view of that in FIG. 3 (without the foot ledge)

Turning to other features of the tool, advantages can be seen and are preferred, for the heal pad 80. For example, the heal pad can have a first portion 90 of the top edge defined by the heal pad being offset a second vertical distance 92 from a second portion 50 of the top edge defined by the middle area to create a second heal gap 94 between a top surface 96 of the heal pad and an imaginary line 48 formed by and extending parallel out from the middle area 40 of the top edge. As another example, and more preferred, the heal pad 80 can be located in the vertical dimension 18 between the imaginary line 48 formed by and extending parallel out from the middle area of the top edge 36 and the imaginary line 46 formed by and extending parallel out from the middle area of the bottom edge 38. As still another example, and even more preferred, the heal pad can extend outward from the middle portion in a horizontal orientation (as seen in FIGS. 6 and 7) that is substantially parallel to the imaginary line 48 formed by and extending parallel out from the middle area of the top edge and the imaginary line 46 formed by and extending parallel out from the middle area of the bottom edge.

Preferred dimensions of the tool are: a total length of about 10 to 14 inches, a width for the middle area and the toe of about 1 to 2 inches, a length of the heal pad of about 3 to 5 inches, and a width of the heal pad of about 2 to 5 inches. Conventional rigid materials can be used to make my tool, in conjunction with the teaching herein, for example, steel, aluminum, or other material compositions of sufficient strength as would be discerned by one of ordinary skill in the art in combination with the teachings herein, are preferred. And, the tool may be separate parts fixedly joined together or a single molded or formed structure with the various parts and features as described herein. In regard to the handle 20, preferred dimensions for length 29 are in the range of about 32 inches to about 42 inches, and where length 29 is more preferably no less than about 30 inches and can be longer than 42 inches to as long as a user could desire to provide additional leverage when using the tool 10 attached thereto. Handle 20 can be made of conventional rigid materials, in conjunction with the teaching herein, for example wood or fiberglass, or other material compositions of sufficient strength as would be discerned by one of ordinary skill in the art in combination with the teachings herein. And, the handle and tool may be separate parts fixedly joined together or a single molded or formed structure with the various parts and features as described herein.

Figure 8:
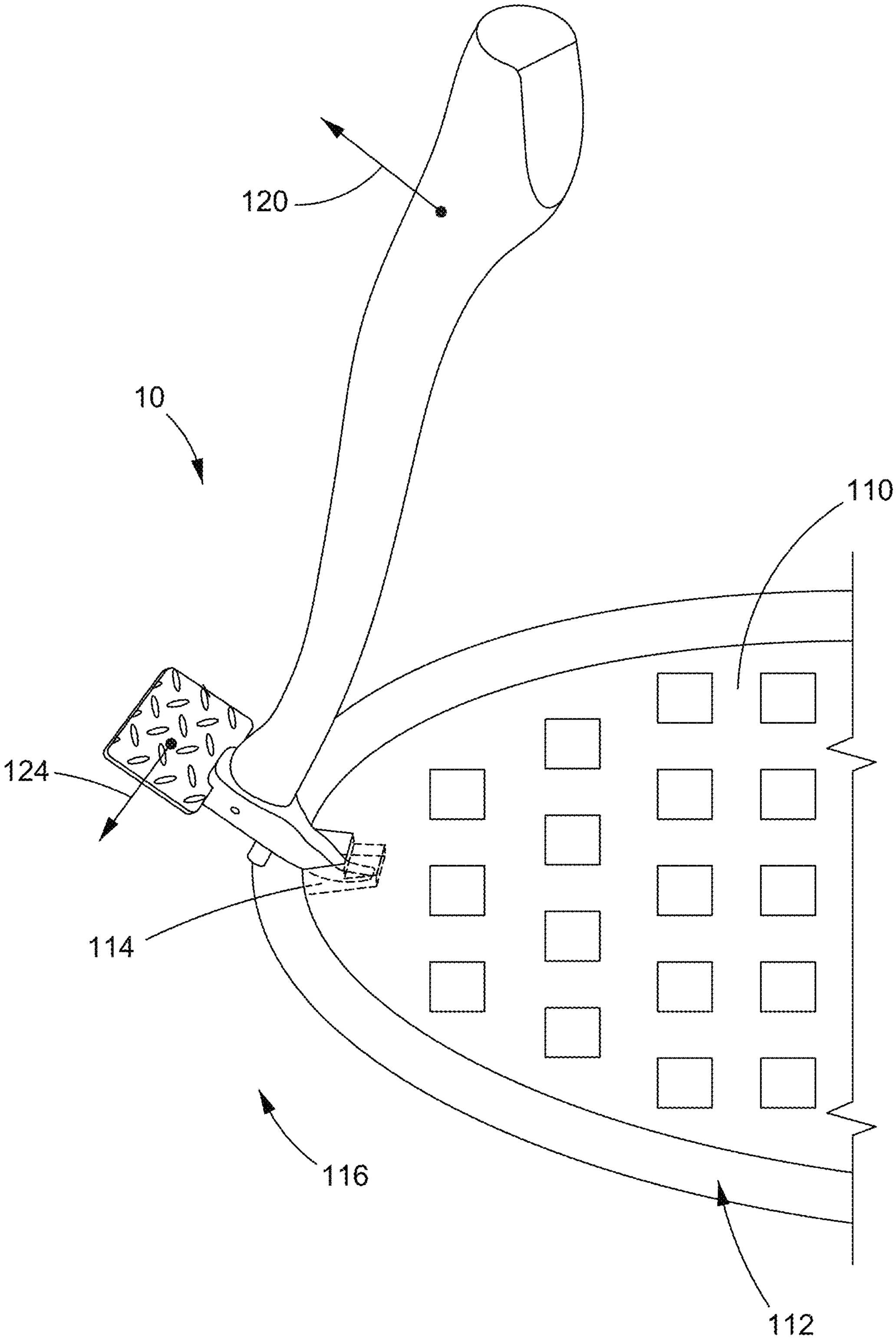
FIG. 8 is a perspective view similar to that in FIG. 2, showing just as the tool has been inserted into the receiving side-hole of the manhole cover and before the cover is in any way unseated from the manhole.

In other aspects of the disclosure, as seen in FIGS. 2 and 8-14, there is a method to move manhole cover 110 relative to manhole 112. A first step is providing a tool, for example tool 10, including body 30 having front end 32 with toe 60, back end 34 with heal pad 80, and middle area 40 located between the toe and the heal pad. The middle area includes fulcrum 100 joined to the middle area 40 and projecting away from bottom edge 38 of the body to create fulcrum gap 106 between bottom surface 108 of the fulcrum and imaginary line 46 formed by and extending parallel out from the bottom edge 38 of the body 30. Middle area 40 also includes elongated handle 20 joined at handle proximal end 26 to the middle area 40 and extending away from the body to distal end 28 of the handle. A next step is inserting the toe 60 of the tool into receiving side-hole 114 of the manhole cover 110. Next, there is positioning the fulcrum 100 of the tool on surface 116 surrounding the manhole cover 110. For example, surface 116 could be specifically surface 113 of the manhole, or the ground area surrounding the manhole 112. Then, there is the step pulling on the distal end of the handle, e.g., represented by force arrow 120, while simultaneously stepping on the heal pad, e.g., represented by force arrow 124, to pivotally lift the manhole cover 110 via the fulcrum 100 and unseat the manhole cover 110 from the manhole 112. As seen in FIG. 8, the manhole cover is fully or completely seated into and with the manhole in an at rest position not being acted upon by the tool. To be unseated means any separation of the manhole cover from the manhole to move the manhole cover from a conventional seated position closing the manhole. As seen in FIG. 2, the manhole cover is starting to be unseated from the manhole.

Figure 9:
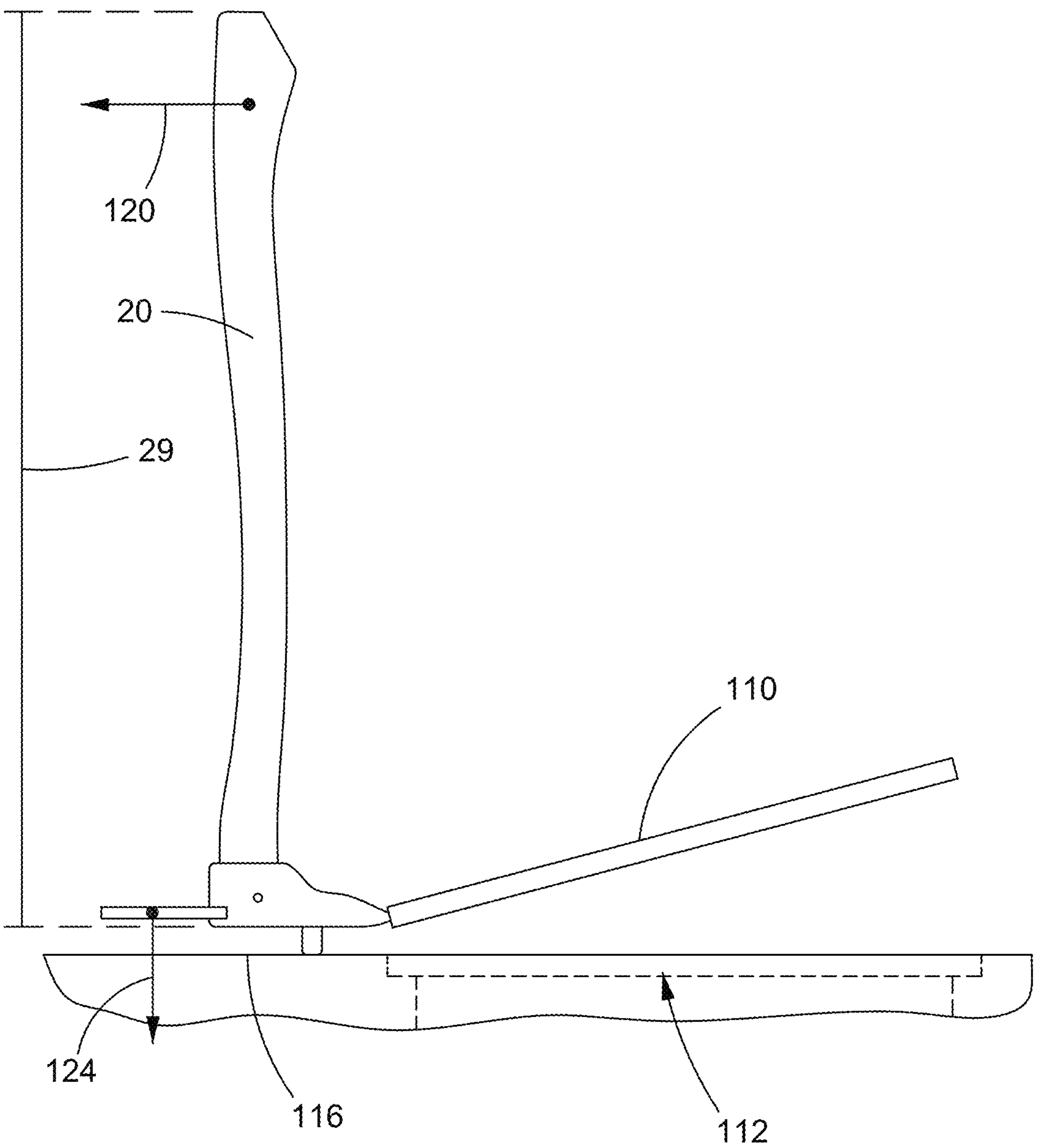
FIG. 9 is a side view of that in FIG. 8, but with the manhole cover completely separated from the manhole and suspended above the manhole at the toe of the tool.
Figure 10:
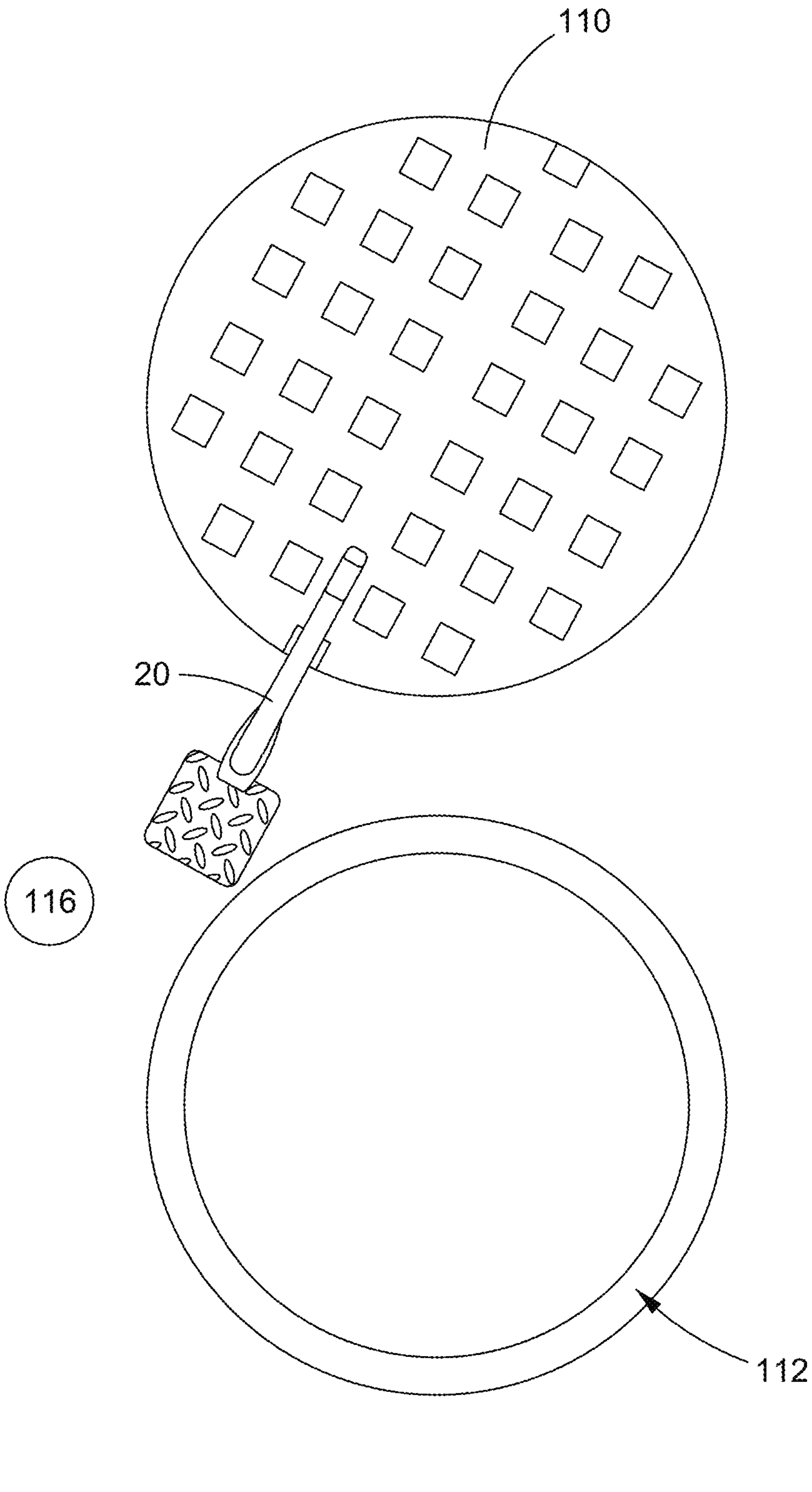
FIG. 10 is a top view of that in FIG. 9, but with tool having been rotated and pivoted to locate the manhole cover not over the manhole, for example alongside the manhole.
Figure 11:
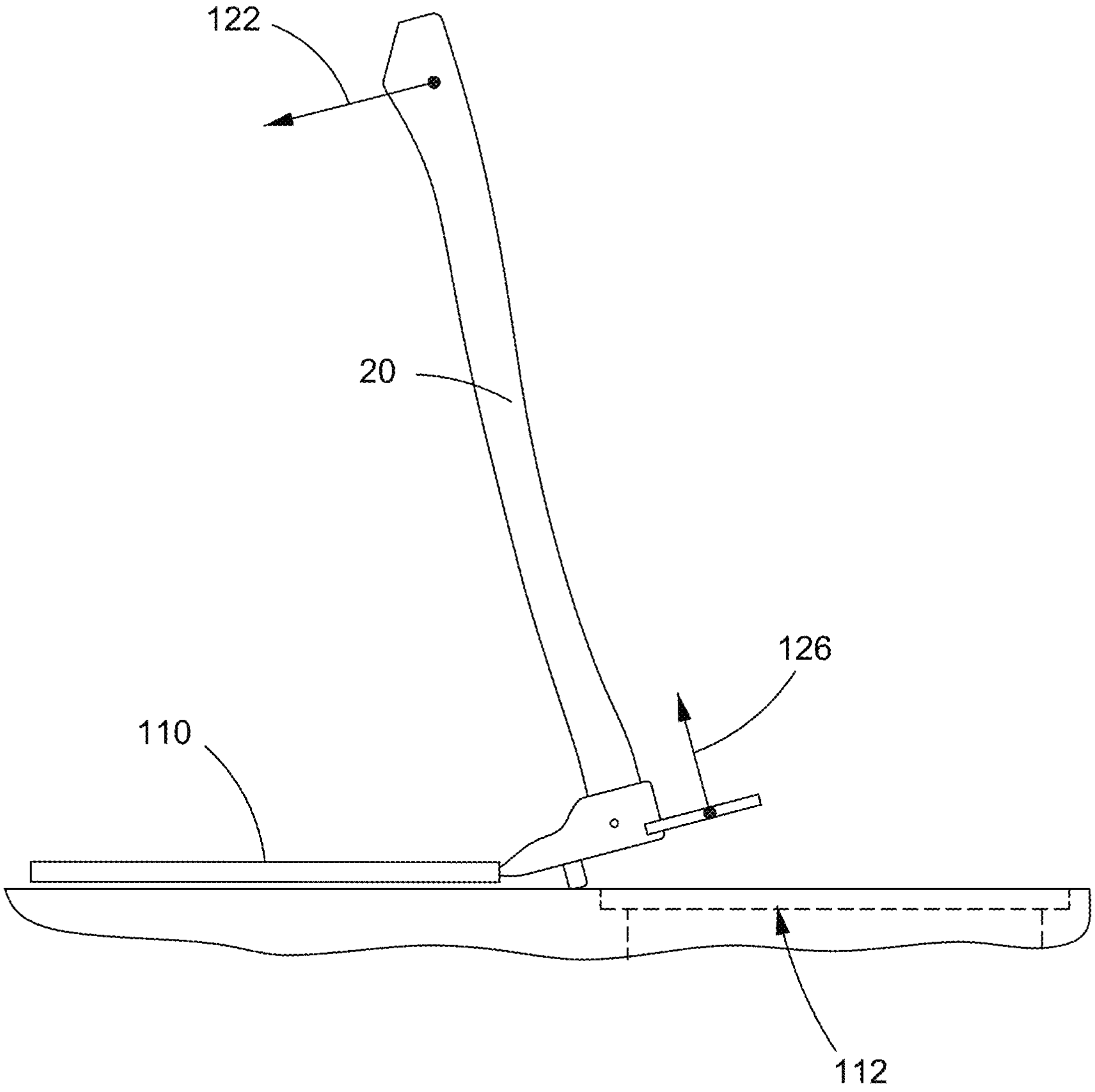
FIG. 11 is a side view of that in FIG. 10, but with the manhole cover pivotally lowered via the fulcrum to the surface surrounding the manhole cover.
Figure 12:
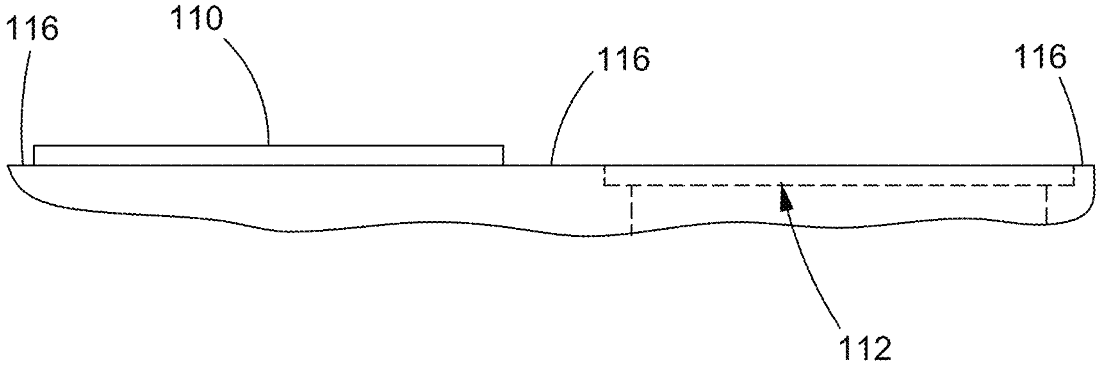
FIG. 12 is a side view of that in FIG. 11, but with the toe of the tool removed from the receiving side-hole of the manhole cover and the manhole cover is not over the manhole, for example, on the adjacent surface such as the ground around the manhole.
Figure 13:
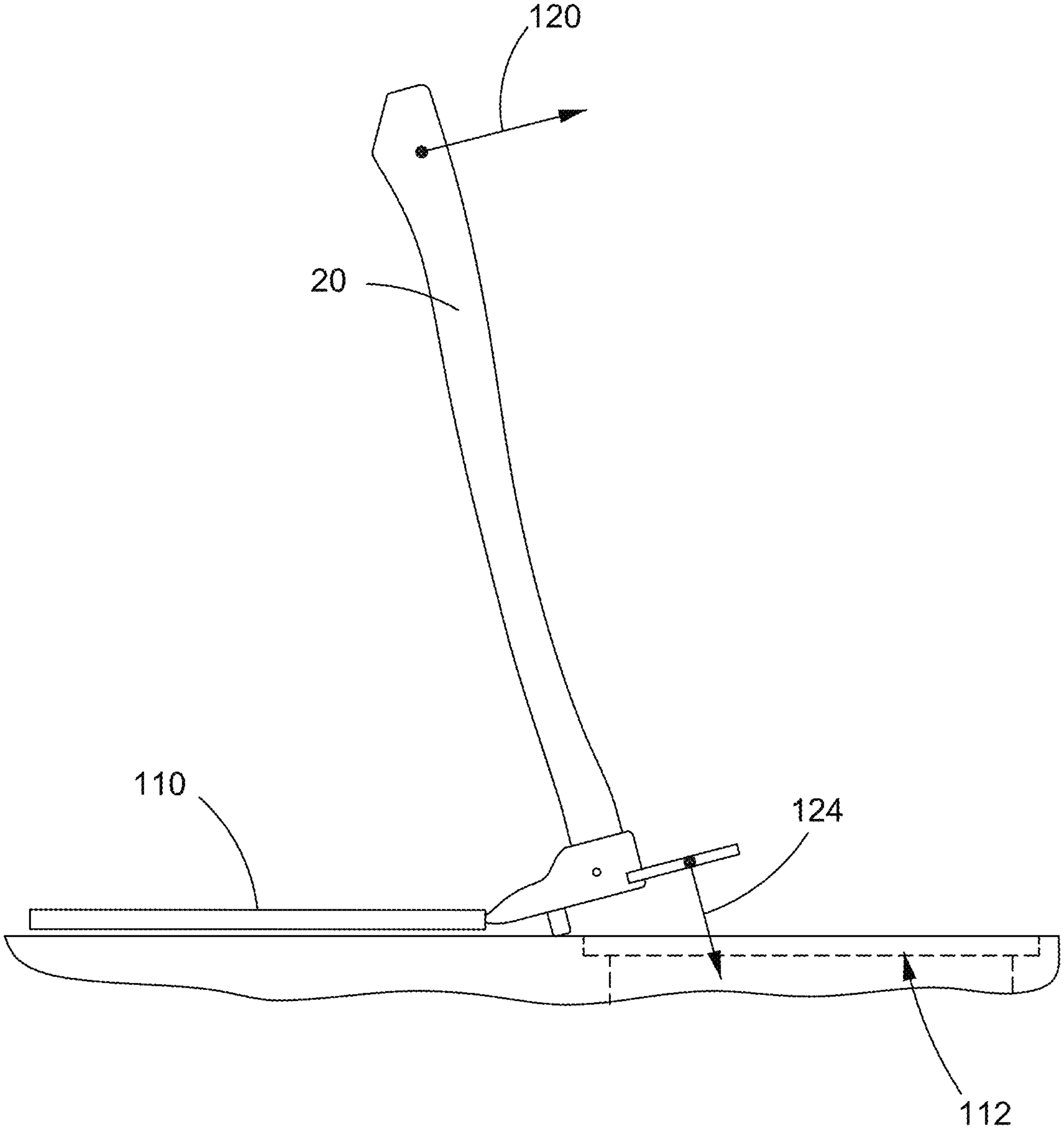
FIG. 13 is a side view of that in FIG. 12, and showing the start of pulling on the distal end of the handle while simultaneously stepping on the heal pad to pivotally lift the manhole cover from the surface via the fulcrum and lifting the manhole cover from the surface; and, FIG. 14 is a perspective view of that in FIG. 13, but with the toe of the tool removed from the receiving side-hole of the manhole cover when the manhole cover is seated with the manhole, and the tool removed from the view and the manhole cover is in the fully seated location in the manhole.

The method can further include other steps, as desired. For example, and as seen in FIG. 9, completely separating the manhole cover 110 from the manhole 112 and suspending the manhole cover at the toe 60 of the tool. Then, and as seen going to the position in FIG. 10, rotating the tool and pivoting the tool on the fulcrum to thereby locate the manhole cover 110 to be not over the manhole 112, e.g., located beside the manhole as also seen in FIGS. 11-13. Another aspect can be where rotating the tool and pivoting the tool on the fulcrum, i.e., going from FIG. 9 to FIG. 10, is primarily driven by stepping on the heal pad with force 124 and rotating the heal pad (i.e., the heal pad moving in a direction toward the right side of the manhole as the manhole cover is rotated toward and over the left side of the manhole and eventually to be not over the manhole in FIG. 10). Further in this regard, it can be preferred, for the method to include using the handle 20 to guide rotating the tool and pivoting the tool on the fulcrum, and most preferred to jointly use the heal pad 80 and handle 20 to do so. Additionally, or alternately, it can be preferred, to apply more force on the heal pad than force is applied on the handle. For example, this can be advantageous to then manipulate and use the handle 20, namely at its distal end 28, to better steer or guide rotation of the tool and manhole cover supported thereby. In another aspect, the heal pad has a flat step on surface 96 in both a heal width dimension 93 and a heal length dimension 95. Further in this regard, the flat step on surface may also include ledge 89 (FIG. 3) as noted above and this does not negate the flat step on surface, but in fact, ledge 89 can be advantageous to how heal pad 80 works.

Yet other, additional and optional, steps of the method are now discussed. Seen in going from the positioning in FIG. 10 to that in FIG. 11, the method can include pivotally lowering the manhole cover 110 via the fulcrum 100 to the surface 116 surrounding the manhole cover 112. Additionally, the step of pivotally lowering the manhole cover can be releasing the distal end of the handle, as represented by force arrow 122. In this regard, releasing means any lessening of the force 120 and thereby making the net resulting force go in direction 122, even though the user may still have their hand (not shown) in contact with distal end 28, and likely does so until the tool is completely removed from the manhole cover. Additionally, or alternately, the step of pivotally lowering the manhole cover can be stepping off the heal pad, as represented by force arrow 126. In this regard, stepping off means any lessening of the force 124 and thereby making the net resulting force go in direction 126, even though the user may still have their foot (not shown) in contact with heal pad 80 at step on surface 96, and likely does so until beginning to remove the tool from the manhole cover side-hole 114. Yet additionally, or alternately, and more preferably, pivotally lowering the manhole cover can be releasing the distal end of the handle while simultaneously stepping off the heal pad, and thus the opposite forces and motion and positioning to that seen in FIG. 8.

Figure 14:
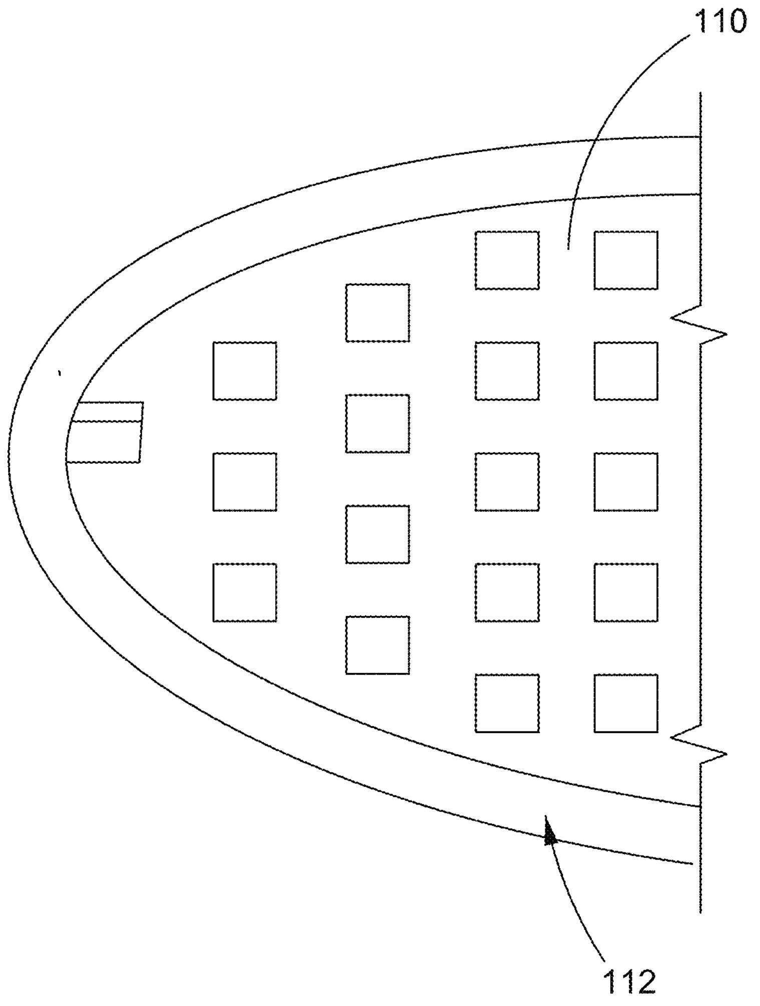

When the manhole cover is fully supported by the surface 116, then to transition from FIG. 11 to FIG. 12, there is the step of removing the toe 60 of the tool from the receiving side-hole 114 of the manhole cover when the manhole cover is not over the manhole. Then, when it is time to return the manhole cover to the manhole, e.g., going from FIG. 12 to FIG. 13, there can be the step of pulling on the distal end of the handle while simultaneously stepping on the heal pad to pivotally lift the manhole cover from the surface via the fulcrum and lifting the manhole cover from the surface (i.e., and once lifted off of surface 116 then the tool and manhole cover are generally positioned as in FIG. 9, but with the manhole cover still beside the manhole and not yet over the manhole). Further in this regard, and going from FIG. 13 to FIG. 14 (and thus doing FIGS. 9-11 in reverse), there can be the step of rotating the tool 10 and pivoting the tool on the fulcrum 100 to thereby locate the manhole cover to be over the manhole (FIG. 9); and then, pivotally lowering the manhole cover 110 via the fulcrum and seating the manhole cover with the manhole 112 (FIG. 8 to FIG. 9 in reverse); and then, removing the toe of the tool 10 from the receiving side-hole 114 of the manhole cover when the manhole cover is seated with the manhole (FIG. 14).

Additional discussion of embodiments in various scopes now follows:

A. A tool joinable with a handle to aid in moving a manhole cover from a manhole. The tool includes a body extending from a front end to a back end and from a top edge to a bottom edge. The body further includes a middle area located between the front end and the back end and bounded by the top edge and the bottom edge, with the middle area configured to be joinable to the handle and the handle selectively securable to the body in a fixed relationship. The front end of the body includes a toe extending away from the middle area. The toe includes (i) a first vertical thickness equal to a middle vertical thickness of the middle area where the toe is joined to the middle area, and (ii) a second vertical thickness less than the first vertical thickness for a length of the toe extending away from the middle area. The back end of the body includes a heal pad extending away from the middle area with a first portion of the bottom edge defined by the heal pad being offset a first vertical distance from a second portion of the bottom edge defined by the middle area to create a heal gap between a bottom surface of the heal pad and an imaginary line formed by and extending parallel out from the second portion of the bottom edge defined by the middle area.

B. A tool joinable with a handle. The tool includes a body extending from a front end to a back end and from a top edge to a bottom edge. The body includes a middle area located between the front end and the back end and bounded by the top edge and the bottom edge, with the middle area configured to be joinable to the handle and the handle selectively securable to the body in a fixed relationship. The front end of the body includes a toe extending away from the middle area. The toe includes (i) a first vertical thickness equal to a middle vertical thickness of the middle area where the toe is joined to the middle area, and (ii) a second vertical thickness less than the first vertical thickness for a length of the toe extending away from the middle area. The back end of the body includes a heal pad extending away from the middle area with a first portion of the bottom edge defined by the heal pad being offset a first vertical distance from a second portion of the bottom edge defined by the middle area to create a heal gap between a bottom surface of the heal pad and an imaginary line formed by and extending parallel out from the second portion of the bottom edge defined by the middle area. The bottom edge is flat in an end-to-end dimension for essentially an entirety of the bottom edge except for the toe and a toe portion of the top edge having a concave upward shape. A fulcrum is joined to the body and defining a fulcrum portion of the bottom edge with the fulcrum projecting away from the top edge.

C. A tool joinable with a handle. The tool includes a body extending from a front end to a back end and from a top edge to a bottom edge. The body includes a middle area located between the front end and the back end and bounded by the top edge and the bottom edge, with the middle area configured to be joinable to the handle and the handle selectively securable to the body in a fixed relationship. The front end of the body includes a toe extending away from the middle area. The toe includes (i) a first vertical thickness equal to a middle vertical thickness of the middle area where the toe is joined to the middle area, and (ii) a second vertical thickness less than the first vertical thickness for a length of the toe extending away from the middle area. A fulcrum is joined to the body and defining a fulcrum portion of the bottom edge with the fulcrum projecting away from the top edge. The fulcrum portion is offset a second vertical distance from the second portion of the bottom edge defined by the middle area to create a fulcrum gap between a bottom surface of the fulcrum and the imaginary line formed by and extending parallel out from the middle area of the bottom edge.

D. The tool of any of the prior embodiments, wherein an entirety of the length of the toe except where the toe is joined to the middle area is defined by the second vertical thickness.

E. The tool of any of the prior embodiments, wherein the bottom edge is flat in a end-to-end dimension.

F. The tool of any of the prior embodiments, wherein the bottom edge is flat in a side-to-side dimension.

G. The tool of any of the prior embodiments, wherein the bottom edge is flat in the end-to-end dimension for essentially an entirety of the bottom edge except for the toe.

H. The tool of any of the prior embodiments, further comprising a toe portion of the top edge having a concave upward shape.

I. The tool of any of the prior embodiments, further comprising the toe portion of the top edge having the concave upward shape formed adjacent to a concave downward shape.

J. The tool of any of the prior embodiments, further comprising the toe portion of the top edge having the downward shape sandwiched between two toe portions each having the concave upward shape.

K. The tool of any of the prior embodiments, further comprising a toe portion of the top edge having a concave upward shape for an outer tip of the toe.

L. The tool of any of the prior embodiments, wherein the second vertical thickness at the outer tip of the toe narrows to a sharp vertex.

M. The tool of any of the prior embodiments, further comprising a fulcrum joined to the body and defining a fulcrum portion of the bottom edge with the fulcrum projecting away from the top edge.

N. The tool of any of the prior embodiments, wherein the fulcrum portion is offset a second vertical distance from the second portion of the bottom edge defined by the middle area to create a fulcrum gap between a bottom surface of the fulcrum and the imaginary line formed by and extending parallel out from the middle area of the bottom edge.

O. The tool of any of the prior embodiments, wherein the fulcrum gap is at least about ½ inch and less than about 1.5 inches.

P. The tool of any of the prior embodiments, wherein the handle has a circumference where it is joinable to the middle area and defines a handle vertical circumferential projection extending to and through the bottom edge of the body, and at least a portion of the fulcrum is located outside the handle vertical circumferential projection.

Q. The tool of any of the prior embodiments, wherein the fulcrum is located closer to the toe than to the heal pad.

R. The tool of any of the prior embodiments, wherein the fulcrum is located closer to the toe than to the heal pad.

S. The tool of any of the prior embodiments, wherein the bottom edge is flat in an end-to-end dimension for essentially an entirety of the bottom edge except for the toe and the fulcrum.

T. The tool of any of the prior embodiments, wherein the handle is fixedly joined with the tool.

U. The tool of any of the prior embodiments, further comprising the heal pad with a first portion of the top edge defined by the heal pad being offset a second vertical distance from a second portion of the top edge defined by the middle area to create a second heal gap between a top surface of the heal pad and an imaginary line formed by and extending parallel out from the middle area of the top edge.

V. The tool of any of the prior embodiments, wherein the heal pad is located in a vertical dimension between the imaginary line formed by and extending parallel out from the middle area of the top edge and the imaginary line formed by and extending parallel out from the middle area of the bottom edge.

W. The tool of any of the prior embodiments, wherein the heal pad extends outward from the middle portion in a horizontal orientation that is substantially parallel to the imaginary line formed by and extending parallel out from the middle area of the top edge and the imaginary line formed by and extending parallel out from the middle area of the bottom edge.

X. The tool of any of the prior embodiments, wherein the heal gap is at least about ¼ inch and less than about 1 inch.

Y. The tool of any of the prior embodiments, wherein the heal pad has a heal horizontal width that is greater than a middle area horizontal width.

Z. A method to move a manhole cover relative to a manhole. The method includes providing a tool including a body having a front end with a toe, a back end with a heal pad, and a middle area located between the toe and the heal pad. The middle area includes (i) a fulcrum joined to the middle area and projecting away from a bottom edge of the body to create a fulcrum gap between a bottom surface of the fulcrum and an imaginary line formed by and extending parallel out from the bottom edge of the body and (i) an elongated handle joined at a handle proximal end to the middle area and extending away from the body to a distal end of the handle. The method also includes inserting the toe of the tool into a receiving side-hole of the manhole cover. Further the method includes positioning the fulcrum of the tool on a surface surrounding the manhole cover. Yet further, the method includes pulling on the distal end of the handle while simultaneously stepping on the heal pad to pivotally lift the manhole cover via the fulcrum and unseating the manhole cover from the manhole.

AA. A method to move a manhole cover relative to a manhole. The method includes providing a tool including a body having a front end with a toe, a back end with a heal pad, and a middle area located between the toe and the heal pad. The middle area includes (i) a fulcrum joined to the middle area and projecting away from a bottom edge of the body to create a fulcrum gap between a bottom surface of the fulcrum and an imaginary line formed by and extending parallel out from the bottom edge of the body and (i) an elongated handle joined at a handle proximal end to the middle area and extending away from the body to a distal end of the handle. The method also includes inserting the toe of the tool into a receiving side-hole of the manhole cover. Further the method includes positioning the fulcrum of the tool on a surface surrounding the manhole cover. Still further, there is the step guiding the distal end of the handle while simultaneously stepping on the heal pad to pivotally lift the manhole cover via the fulcrum and unseating the manhole cover from the manhole. Yet further, there is completely separating the manhole cover from the manhole and rotating the tool and pivoting the tool on the fulcrum to thereby locate the manhole cover over the surface surrounding the manhole cover and then lowering the manhole cover onto the surface.

BB. The method of any of the prior method embodiments, further comprising completely separating the manhole cover from the manhole and suspending the manhole cover at the toe of the tool.

CC. The method of any of the prior method embodiments, further comprising rotating the tool and pivoting the tool on the fulcrum to thereby locate the manhole cover to be not over the manhole.

DD. The method of any of the prior method embodiments, wherein rotating the tool and pivoting the tool on the fulcrum is primarily driven by stepping on the heal pad and rotating the heal pad.

EE. The method of any of the prior method embodiments, further comprising using the handle to guide rotating the tool and pivoting the tool on the fulcrum.

FF. The method of any of the prior method embodiments, further comprising pivotally lowering the manhole cover via the fulcrum to the surface surrounding the manhole cover.

GG. The method of any of the prior method embodiments, wherein pivotally lowering the manhole cover comprises releasing the distal end of the handle.

HH. The method of any of the prior method embodiments, wherein pivotally lowering the manhole cover comprises stepping off the heal pad.

II. The method of any of the prior method embodiments, wherein pivotally lowering the manhole cover comprises releasing the distal end of the handle while simultaneously stepping off the heal pad.

JJ. The method of any of the prior method embodiments, further comprising removing the toe of the tool from the receiving side-hole of the manhole cover when the manhole cover is not over the manhole.

KK. The method of any of the prior method embodiments, further comprising pulling on the distal end of the handle while simultaneously stepping on the heal pad to pivotally lift the manhole cover from the surface via the fulcrum and lifting the manhole cover from the surface.

LL. The method of any of the prior method embodiments, further comprising rotating the tool and pivoting the tool on the fulcrum to thereby locate the manhole cover to be over the manhole.

MM. The method of any of the prior method embodiments, further comprising pivotally lowering the manhole cover via the fulcrum and seating the manhole cover with the manhole.

NN. The method of any of the prior method embodiments, further comprising removing the toe of the tool from the receiving side-hole of the manhole cover when the manhole cover is seated with the manhole.

OO. The method of any of the prior method embodiments, wherein pulling on the distal end of the handle while simultaneously stepping on the heal pad comprises applying more force on the heal pad than force is applied on the handle.

PP. The method of any of the prior method embodiments, wherein the surface includes a portion of the manhole.

QQ. The method of any of the prior method embodiments, wherein the heal pad has a flat step on surface in both a heal width dimension and a heal length dimension.

RR. The method of any of the prior method embodiments, wherein the handle has a circumference where the handle is joined to the middle area and defines a handle vertical circumferential projection extending parallel to a length of the handle to and through the bottom edge of the body, and at least a portion of the fulcrum is located outside of the handle vertical circumferential projection.

SS. The method of any of the prior method embodiments, further comprising the heal pad offset a vertical distance from the bottom edge of the body to create a heal gap between a bottom surface of the heal pad and an imaginary line formed by and extending parallel out from the bottom edge of the body.

Each and every document cited in this present application, including any cross referenced or related patent or application, is incorporated in this present application in its entirety by this reference, unless expressly excluded or otherwise limited. The citation of any document is not an admission that it is prior art with respect to any embodiment disclosed in this present application or that it alone, or in any combination with any other reference or references, teaches, suggests, or discloses any such embodiment. Further, to the extent that any meaning or definition of a term in this present application conflicts with any meaning or definition of the same term in a document incorporated by reference, the meaning or definition assigned to that term in this present application governs.

The present invention includes the description, examples, embodiments, and drawings disclosed; but it is not limited to such description, examples, embodiments, or drawings. As briefly described above, the reader should assume that features of one disclosed embodiment can also be applied to all other disclosed embodiments, unless expressly indicated to the contrary. Unless expressly indicated to the contrary, the numerical parameters set forth in the present application are approximations that can vary depending on the desired properties sought to be obtained by a person of ordinary skill in the art without undue experimentation using the teachings disclosed in the present application. Modifications and other embodiments will be apparent to a person of ordinary skill in the applicable mechanical tools arts, and all such modifications and other embodiments are intended and deemed to be within the scope of the present invention.

What is claimed is:

1. A method to move a manhole cover relative to a manhole, comprising:

providing a tool including a body having a front end with a toe, a back end with a heal pad, and a middle area located between the toe and the heal pad, wherein the middle area includes (i) a fulcrum joined to the middle area and projecting away from a bottom edge of the body to create a fulcrum gap between a bottom surface of the fulcrum and an imaginary line formed by and extending parallel out from the bottom edge of the body and (i) an elongated handle joined at a handle proximal end to the middle area and extending away from the body to a distal end of the handle;

inserting the toe of the tool into a receiving side-hole of the manhole cover;

positioning the fulcrum of the tool on a surface surrounding the manhole cover; and, pulling on the distal end of the handle while simultaneously stepping on the heal pad to pivotally lift the manhole cover via the fulcrum and unseating the manhole cover from the manhole, wherein the handle has a circumference where the handle is joined to the middle area and defines a handle vertical circumferential projection extending parallel to a length of the handle to and through the bottom edge of the body and at least a portion of the fulcrum is located outside of the handle vertical circumferential projection.

2. The method of claim 1, further comprising completely separating the manhole cover from the manhole and suspending the manhole cover at the toe of the tool.

3. The method of claim 2, further comprising rotating the tool and pivoting the tool on the fulcrum to thereby locate the manhole cover to be not over the manhole.

4. The method of claim 3, wherein rotating the tool and pivoting the tool on the fulcrum is primarily driven by stepping on the heal pad and rotating the heal pad.

5. The method of claim 4, further comprising using the handle to guide rotating the tool and pivoting the tool on the fulcrum.

6. The method of claim 3, further comprising pivotally lowering the manhole cover via the fulcrum to the surface surrounding the manhole cover.

7. The method of claim 6, wherein pivotally lowering the manhole cover comprises releasing the distal end of the handle.

8. The method of claim 6, wherein pivotally lowering the manhole cover comprises stepping off the heal pad.

9. The method of claim 6, wherein pivotally lowering the manhole cover comprises releasing the distal end of the handle while simultaneously stepping off the heal pad.

10. The method of claim 6, further comprising removing the toe of the tool from the receiving side-hole of the manhole cover when the manhole cover is not over the manhole.

11. The method of claim 6, further comprising pulling on the distal end of the handle while simultaneously stepping on the heal pad to pivotally lift the manhole cover from the surface via the fulcrum and lifting the manhole cover from the surface.

12. The method of claim 11, further comprising rotating the tool and pivoting the tool on the fulcrum to thereby locate the manhole cover to be over the manhole.

13. The method of claim 12, further comprising pivotally lowering the manhole cover via the fulcrum and seating the manhole cover with the manhole.

14. The method of claim 13, further comprising removing the toe of the tool from the receiving side-hole of the manhole cover when the manhole cover is seated with the manhole.

15. The method of claim 1, wherein pulling on the distal end of the handle while simultaneously stepping on the heal pad comprises applying more force on the heal pad than force is applied on the handle.

16. The method of claim 1, wherein the surface includes a portion of the manhole.

17. The method of claim 1, wherein the heal pad has a flat step on surface in both a heal width dimension and a heal length dimension.

18. The method of claim 1, further comprising the heal pad offset a vertical distance from the bottom edge of the body to create a heal gap between a bottom surface of the heal pad and the imaginary line formed by and extending parallel out from the bottom edge of the body.

19. A method to move a manhole cover relative to a manhole, comprising:

providing a tool including a body having a front end with a toe, a back end with a heal pad, and a middle area located between the toe and the heal pad, wherein the middle area includes (i) a fulcrum joined to the middle area and projecting away from a bottom edge of the body to create a fulcrum gap between a bottom surface of the fulcrum and an imaginary line formed by and extending parallel out from the bottom edge of the body and (i) an elongated handle joined at a handle proximal end to the middle area and extending away from the body to a distal end of the handle;

inserting the toe of the tool into a receiving side-hole of the manhole cover;

positioning the fulcrum of the tool on a surface surrounding the manhole cover;

guiding the distal end of the handle while simultaneously stepping on the heal pad to pivotally lift the manhole cover via the fulcrum and unseating the manhole cover from the manhole, wherein pulling on the distal end of the handle while simultaneously stepping on the heal pad comprises applying more force on the heal pad than force is applied on the handle; and completely separating the manhole cover from the manhole and rotating the tool and pivoting the tool on the fulcrum to thereby locate the manhole cover over the surface surrounding the manhole cover and then lowering the manhole cover onto the surface.

20. The method of claim 19, wherein the handle has a circumference where the handle is joined to the middle area and defines a handle vertical circumferential projection extending parallel to a length of the handle to and through the bottom edge of the body, and at least a portion of the fulcrum is located outside of the handle vertical circumferential projection.

* * * * *